Patented Apr. 27, 1943

2,317,741

UNITED STATES PATENT OFFICE 2,317,741

SPRAY COMPOSITION

Clarence D. Dolman, Chelan County, Wash., assignor to Hercules Glue Company, Ltd., a corporation of California No Drawing. Application June 28, 1940,
Serial No. 343,025

2 Claims. (Cl. 167—32)

This invention relates to a new and useful spray material for application to fruit trees and the like to secure pest control.

Among the pests affecting vegetation detrimentally are mites and like pests. I have discovered that naphthalene and materials closely related to naphthalene such as chlorinated naphthalene, also known as halowax, are useful against mites, as well as assisting in the control of other pests.

In employing naphthalene for pest control I have found that this material, when applied to fruit and vegetation, crystallizes readily. Further, these crystals grow rapidly so that instead of an even, uniform cover being provided on the vegetation, relatively large crystals or flakes of the naphthalene appear in isolated spots. This deposit does not provide uniform or adequate protection or control.

After considerable investigation I have discovered that naphthalene and related materials can be successfully employed in insecticidal compositions and effective pest control secured if the crystal growth tendency of naphthalene be inhibited. Further, I have found that naphthalene can be held in a finely divided state of division until it is distributed on the surface of the vegetation, even under adverse storage conditions, and this same crystal growth tendency inhibited when the naphthalene is deposited as a spray on the vegetation, if the naphthalene, or related material, is combined with an adsorbent carrier material. As a suitable carrier I have successfully used diatomaceous earth as well as bentonite but any other suitable material having adsorbent properties and being finely divided and dry can be employed. Such materials are walnut shell flour, wood flour, talc and the like.

One of the most successful materials which I have been able to produce is made up as a mixture of a finely divided substantially water insoluble insecticide or fungicide and naphthalene. I have taken a mixture of lead arsenate and naphthalene, mixing the two materials and grinding the naphthalene into the lead arsenate so that the lead arsenate finally contains from ½% to 75% of naphthalene with success. In place of lead arsenate any other finely divided dry water insoluble insecticidal or fungicidal material, whether organic or inorganic, can be employed. Such other materials are typically a xanthone, a rotenone containing material, pyrethrum, cryolite, the other arsenates and arsenites.

In incorporating the naphthalene into the dry carrier material the naphthalene may be heated and poured into the dry carrier as a molten liquid, being thereafter thoroughly ground into the carrier. I have also successfully dissolved the naphthalene in a suitable oil, then adding the solution to the dry carrier. As an oil I have employed a mineral oil having a viscosity from slightly under that of kerosene to about 95 sec. Saybolt but other vegetable and animal oils of suitable viscosity can be employed as well as other suitable solvents.

I have also softened the naphthalene with a fatty acid, mixing the two and then depositing them on the dry carrier to finally provide a mix of uniform naphthalene concentration. In other instances I have successfully dissolved the naphthalene and the fatty acid in a mutual solvent therefor such as kerosene or a chlorinated hydrocarbon such as ethylene dichloride.

The amount of dry carrier material added to the naphthalene is such that crystal growth in the naphthalene is prohibited. With diatomaceous earth about equal parts by weight of the two materials should be employed although I prefer to employ twice as much diatomaceous earth as naphthalene. Definitely crystalline materials as lead arsenate and other insecticides are more effective and the carrier-naphthalene ratio can be increased and as much as three and four parts of naphthalene can be mixed with one part of carrier successfully.

When fatty acid is included in the dry carrier together with the naphthalene, the material is made up into an aqueous spray composition very simply by addition of a surface tension reducing material of the class exemplified by sodium oleate or other fatty acid soap or ester.

In practice I have successfully employed the following composition, the amounts specified being based on the proportion with 100 gallons of water:

3 pounds of lead arsenate and ⅛ pound of Multifilm spreader (a fatty acid, soap, diatomaceous earth composition such as is disclosed in my co-pending application Serial Number 268,619 filed April 18, 1939) were agitated with water. A half pound of the naphthalene-carrier material mix was then added, this material having been made up in the proportions of 2 pounds of diatomaceous earth to 2 pounds of naphthalene first dissolved in a pint of kerosene containing 5% of oleic acid. This spray composition applied to apples successfully destroyed both the larvae of the codling moth and the various spider and mite pests while fruit not so treated was heavily infected. The appearance of the fruit was not harmed nor was the metabolism of the tree interfered with.

If desired, the naphthalene can be incorporated into the dry inert carrier material employed in conjunction with the fatty acid, fatty acid soap or fatty acid ester and oil mixture disclosed in my aforementioned application. When naphthalene is included in such a composition, the spray deposit has a much better, more uniform appearance than when naphthalene is omitted.

When the material of the present invention is examined under the microscope, minute crystals of naphthalene are found thoroughly and uniformly disseminated throughout the carrier. Apparently when naphthalene, or solutions of naphthalene, are mixed with the dry carrier materials of the present invention, inert substances having adsorbent properties, the tendency to form large crystals is entirely prevented, even when the naphthalene is in contact with oil and is sprayed in the presence of other materials on fruit. The crystal growth inhibiting power is most marked when the carrier is definitely crystalline as in the case of lead arsenate.

When lead arsenate is employed as the carrier, the ratio of the naphthalene to carrier can be increased. The lead arsenate-naphthalene base can vary between relatively wide limits, as I have indicated. Successful control is secured by thoroughly mixing 2½ pounds of lead arsenate with a half pound of naphthalene. This material, when added to 100 gallons of water together with about a sixth of a pound of a suitable spreader, provides more effective control than with either material alone.

Other spray tank mixes have been successfully made up as follows: Two pounds (more or less within the limits specified) of naphthalene were mixed into a gallon of mineral oil containing a half pint of oleic acid. This solution was mixed with six pounds of lead arsenate, two-thirds of a pound of a suitable spreader (Multifilm or Multifilm 77 can be used) and ten gallons of water until a thick creamy paste was obtained. More or less water may be used as necessary to obtain thick uniform paste. After a homogeneous mix was obtained the whole was dumped into a two hundred gallon tank, almost full of water, and under agitation. The mixture immediately flocculated, disseminated through the water, and was ready for spraying.

I claim:

1. The method of preparing an insecticidal material comprising dissolving a mass of naphthalene and about 10% of said mass of a fatty acid in a mutual solvent therefor and then dispersing the so formed solution throughout a mass of about equal weight of a dry finely divided adsorbent carrier material.

2. The method of preparing an insecticidal material comprising dissolving a mass of naphthalene and about 10% of said mass of oleic acid in a mutual mineral oil solvent therefor and then dispersing the so formed solution throughout a mass of about equal weight of a dry finely divided adsorbent carrier material.

CLARENCE D. DOLMAN.